Aug. 12, 1941.                H. SINCLAIR                    2,252,042
                          REVERSING MECHANISM
                         Filed Feb. 10, 1939              2 Sheets-Sheet 1

INVENTOR
Harold Sinclair
BY
ATTORNEYS

Aug. 12, 1941.   H. SINCLAIR   2,252,042
REVERSING MECHANISM
Filed Feb. 10, 1939   2 Sheets-Sheet 2

INVENTOR
Harold Sinclair
BY
Dean Fairbank & Horsch
ATTORNEYS

Patented Aug. 12, 1941

2,252,042

UNITED STATES PATENT OFFICE 2,252,042

REVERSING MECHANISM

Harold Sinclair, Kensington, London, England

Application February 10, 1939, Serial No. 255,617
In Great Britain February 14, 1938

5 Claims. (Cl. 74—189.5)

This invention relates to reversing gearing and to power plants embodying reversing gearing.

An object of this invention is to provide a reversing gearing embodying synchronizing couplings for selecting forward and reverse drives.

Another object is to provide in reversing gearing improved means whereby the driven element of the gearing is arrested and the change from forward to reverse drive or vice versa is thereafter effected.

A further object is to provide, in a power plant embodying reversing gearing, improved reversing control means.

Further objects and advantages of the invention will be apparent from the example of an embodiment thereof shown in the accompanying diagrammatic drawings, in which.

Figure 1:
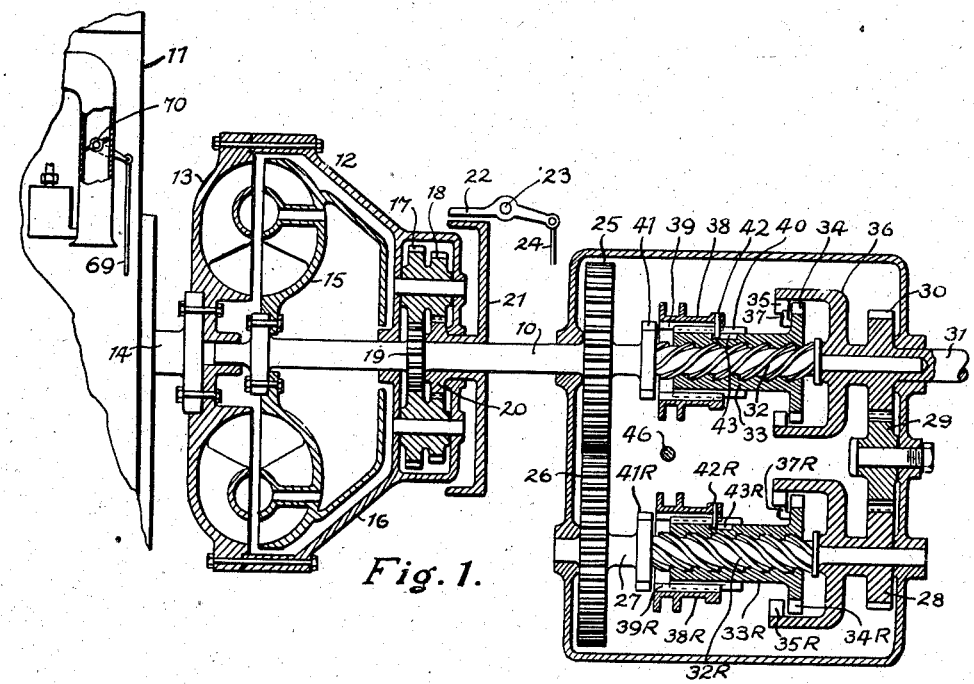
Fig. 1 is a sectional side elevation of part of a marine power plant.

The plant shown in Fig. 1 includes a reversing gear of the countershaft type. The input shaft 10 of the reversing gear is connected to an internal-combustion engine 11 by a hydraulic coupling 12 of the kinetic type associated with controllable planetary gearing adapted temporarily to impart a slow reverse rotation to the shaft 10 by the agency of power applied by the engine. The hydraulic coupling includes an impeller 13 fixed to the engine crankshaft 14, and a runner 15 fixed to the shaft 10. A casing 16 fixed to the impeller carries one or more pairs of planet pinions, such as 17 and 18, one of which is slightly larger than the other. The larger pinion 17 meshes with a sun wheel 19 rigid with the shaft 10, while the smaller pinion 18 meshes with a sun wheel 20 fast on the hub of a brake drum 21 which is journalled on the shaft 10. A brake member 22, pivoted on a fixed pin 23, can be engaged with the drum 21 in consequence of upward movement of a push rod 24. When the drum 21 is held stationary and the engine is running, the planet pinions are rolled by the member 16 round the stationary sun wheel 20 and thereby impart a slow backward rotation to the shaft 10.

The shaft 10 is fixed to a gear wheel 25 meshing with a gear wheel 26 fixed to a countershaft 27. A gear wheel 28 journalled on the countershaft is connected through an idler wheel 29 with a gear wheel 30 fixed to the output shaft 31. The input shaft 10, which normally rotates clockwise as viewed from the left of Fig. 1, is provided with a left-handed helical thread 32 of steep pitch on which is engaged a nut 33 having teeth 34. These teeth are engageable with teeth 35 on a drum 36 fixed to the output shaft 31. The nut 33 carries one or more pawls such as 37, which are biased outwards by springs (not shown) and which face in the trailing direction so that, when the shaft 10 is rotating forwards faster than the shaft 31, these pawls can ratchet over the teeth 35.

A locking sleeve 38, having internal axial splines 39, is engaged with axial splines 40 on the nut 33. The splines are so arranged that, when the teeth 34 and 35 are fully engaged together, the locking sleeve 38 can be slid to the left to bring its splines 39 into engagement with a splined flange 41 fixed on the shaft 10, whereby the nut 33 is locked to the shaft 10. The locking sleeve 38 is coupled to the nut 33 by a lost-motion connection comprising a radial pin 42 fixed to the sleeve 38 and engaging in a longitudinal groove 43 in the surface of the nut 33. The amount of lost motion permitted slightly exceeds the axial dimension of the teeth 35.

A similar coupling is adapted to connect the countershaft 27 to the gear wheel 28, the only difference being that the countershaft coupling has a right-handed helical thread and the pawls point the other way. The parts of the countershaft coupling have the same reference numerals as corresponding parts of the first described coupling, but distinguished by the reference letter R.

Figure 3:
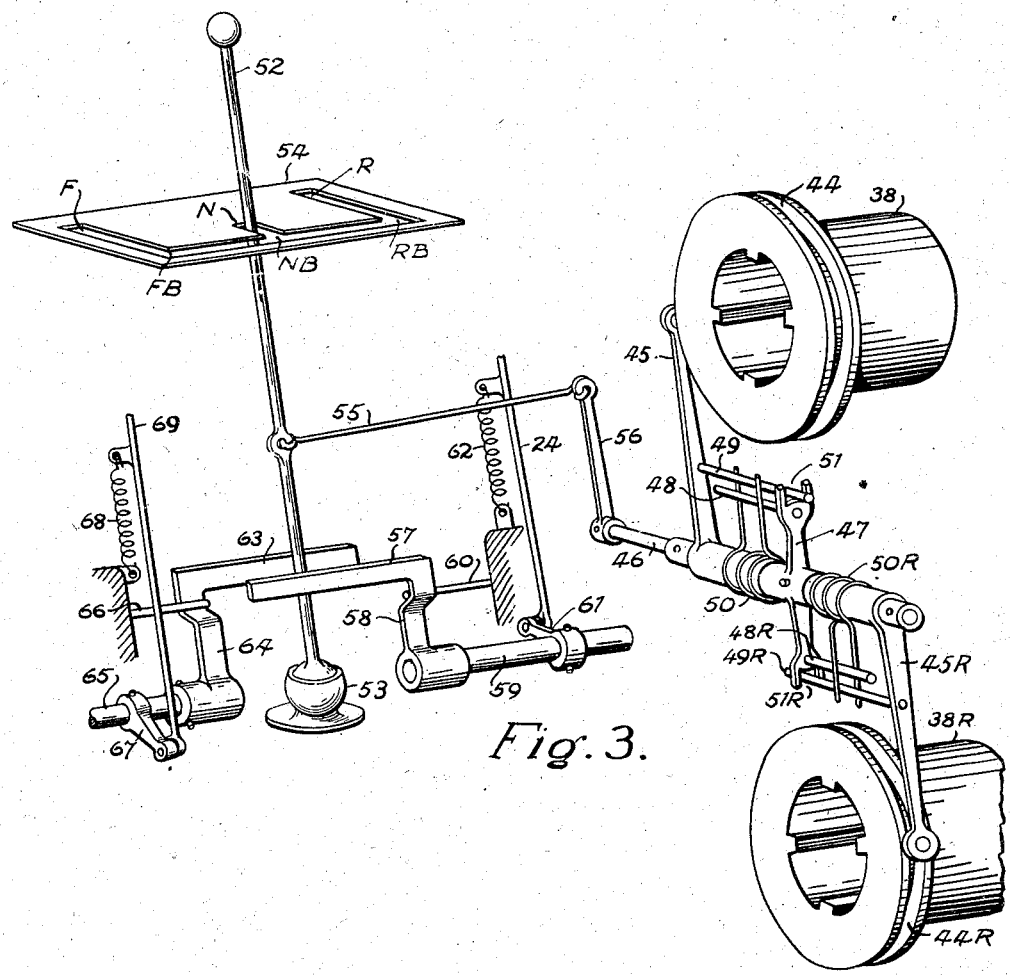
Fig. 3 is a perspective view of control mechanism for the power plant of Fig. 1.

The control mechanism will now be described with reference to Fig. 3. The locking sleeves 38 and 38R of the forward and reverse free-wheel couplings are provided respectively with circumferential grooves 44 and 44R, and these grooves are engaged respectively by pins on the ends of two levers 45 and 45R mounted to rock about a transverse shaft 46, the arrangement being such that, when these rocking levers are in their mid positions, both couplings are in the free-wheeling condition, as shown in Fig. 1. An actuating lever 47 is fixed to the shaft 46 and carries a pin 48 which is parallel to the shaft 46 and to a pin 49 fixed to the rocking lever 45. A torsion spring 50 is disposed around the boss of the rocking lever 45 and its ends are disposed respectively on opposite sides of the pins 48 and 49, the arrangement being such that the spring 50 tends to maintain the levers 45 and 47 in the relationship shown, in which the pins 48 and 49 are adjacent to each other. The lever 47 is provided with a recess 51 accommodating the free end of the pin 49 with a limited degree of lost motion about the axis of the shaft 46. An identical arrangement of resilient connection in parallel with a positive lost-motion connection couples the actuating lever 47 to the rocking lever 45R, corresponding parts being distinguished by the letter R added to the same reference numerals.

The system is controlled by a handle 52 universally mounted at 53 and working in an E shaped gate 54. The handle 52 is connected to the shaft 46 by a link 55 and a crank 56. When the handle 52 is in the short limb N of the gate as shown, or level with this limb, the rocking levers 45 and 45R are normally in their mid positions so that the locking sleeves 38 and 38R are in the positions shown in Fig. 1 and both synchronising couplings are in condition to operate as free wheels.

A bar 57 is mounted on a crank 58 fixed to a shaft 59 journalled by means not shown. A lever 61 fixed to the shaft 59 is pivoted to the push rod 24 that actuates the brake of the planetary gearing and a tension spring 62 normally maintains this brake disengaged and holds the crank 58 against a fixed stop 60.

A bar 63 is mounted on a crank 64 and disposed on the side of the handle 52 opposite to the bar 57. The bar 63 is mounted on a crank 64 fixed to a shaft 65 journalled by means not shown. A lever 67 fixed to the shaft 65 is pivoted to a push rod 69 which when raised opens the throttle valve 70 of the engine (Fig. 1). A tension spring 68 normally holds the crank 64 against a fixed stop 66 and thus maintains the throttle valve in the idling position.

This mechanism operates as follows. It will be assumed that the handle 52 is in the position shown, which represents neutral. The engine 11 is started, the input shaft 10 rotates forward and both free-wheel couplings over-run, the pawls 37 and 37R ratcheting over the teeth 35 and 35R respectively. The handle 52 is now pulled to the point NB, so that it rocks the bar 57, causing the input shaft 10 to be arrested and temporarily urged backwards by the planetary gearing, the slip in the hydraulic coupling 12 permitting the engine to continue idling. Both free-wheel couplings thereupon engage, the nuts 33 and 33R moving to the left against the flanges 41 and 41R and bringing the teeth 34 and 34R cleanly into mesh respectively with the teeth 35 and 35R under the guidance of the pawls 37 and 37R. The gear is thus locked solid, the shaft 10 being at rest and the brake drum 21 slipping under the brake 22. In this condition the pins 42 and 42R are at the right-hand ends of the grooves 43 and 43R.

The handle 52 is now moved say to position FB. The control shaft 46 is consequently rocked anti-clockwise so that the locking sleeve 38 of the forward-drive synchronising coupling is moved to the left, through the agency of the spring 50, until its splines 39 engage with the splined flange 41, and thus this coupling is rendered bi-directionally locked. At the same time the spring 50R urges the reverse-drive coupling locking sleeve 38R to the right; but, since the pin 42R is already at the right-hand end of the groove 43R, the sleeve 38R does not move immediately, the lost motion provided by the recess 51R in the actuating lever 47 permitting the necessary relative angular displacement of the shaft 46 and the lever 45R. The handle 52 is now moved to position F, with the result that the brake 22 is disengaged by the spring 62 and the engine throttle valve 70 is opened by the displacement of the bar 63. The output shaft 31 is now driven forwards through the locked forward-drive synchronising coupling, and the reverse-drive synchronising coupling disengages, the nut 33R running out to its extreme right-hand position where the pawls 37R are out of register with the teeth 35R, and the locking sleeve 38R moving to the right from the position shown in Fig. 1 under the influence of the spring 50R.

To reverse the rotation of the output shaft 31, the handle 52 is moved through position FB and urged towards position RB. The movement to position FB shuts the engine throttle 70 and applies the back-turning brake 22 so that the shafts 10 and 31 are arrested. The movement towards position RB rocks the control shaft 46 clockwise, so that the locking sleeve 38 is displaced through the agency of the spring 50 to the position shown in Fig. 1. Since the inertia of the vessel causes the forward drive coupling to remain engaged under over-running torque, the pin 42 abuts against the right-hand end of the slot 43 and prevents further displacement of the locking sleeve 38 to the right. Meanwhile the locking sleeve 38R has been displaced through the agency of the spring 50R to the position shown in Fig. 1, so that the reverse-drive coupling is in free-wheeling condition. Since the splines 39R are not in register with the splines of the flange 41R, further displacement of the locking sleeve 38R to the left is prevented.

When the input shaft 10, and with it the output shaft 31 attempt to turn in the reverse direction under the influence of the planetary gear, the reverse-drive coupling also engages, the nut 33R moving to its extreme left-hand position and the teeth 34R meshing cleanly with the teeth 35R under the guidance of the pawls 37R. The spring 50R thereupon moves the locking sleeve 38R into engagement with the splined collar 41R, so that the reverse-drive coupling is bi-directionally locked. The pin 49R co-operates with the recess 51R to prevent the handle 52 from reaching the point RB on the gate before the reverse-drive coupling has become bi-directionally locked. The handle 52 is now moved round the corner RB of the gate to the point R, so that the brake 22 is released and the engine throttle is opened. The input shaft 10 now rotates forwards, driving the output shaft backwards through the reverse-drive coupling, and the nut 33 of the forward-drive coupling runs out to its extreme right-hand position where the pawls 37 are out of register with the teeth 35, the locking sleeve 38 moving to the right from the position shown in Fig. 1 under the influence of the spring 50.

The change from reverse to forward gear is effected similarly.

Figure 2:
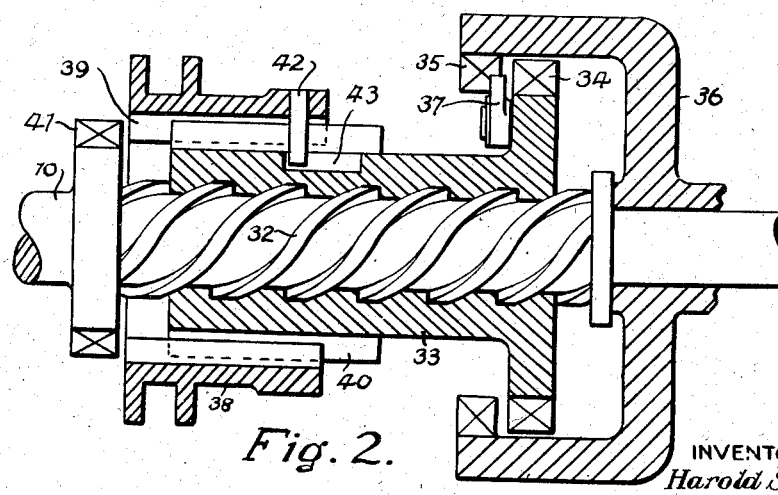
Fig. 2 is a sectional side elevation, to a larger scale, of a part of Fig. 1.

The synchronizing coupling illustrated in Figs. 1 and 2 is disclosed and claimed in my divisional application, Serial No. 352,841, filed August 16, 1940.

I claim:

1. Reversing gearing comprising a forward-drive transmission path in parallel with a reverse-drive transmission path between an input shaft and an output shaft, each of said paths including an inverted free-wheel coupling provided with locking means operable for converting the coupling into condition to transmit both driving and over-running torques, common control means for said couplings, which during a part of the gear-changing operation maintain both of said couplings operative and which are capable of converting said couplings alternatively into their bidirectional driving condition, and means for temporarily imparting a reverse rotation to said input shaft.

2. Reversing gearing comprising a forward-drive transmission path in parallel with a reverse-drive transmission path between an input shaft and an output shaft, each of said paths including an inverted free-wheel coupling provided with locking means operable for converting the coupling into condition to transmit both driving and over-running torques, servo mechanism for temporarily imparting a reverse rotation to said input shaft, and common control means for said servo mechanism and said couplings, said control means serving during a part of the gear-changing operation to maintain both of said couplings and said servo mechanism operative, and said control means being operable for converting either of said couplings at will into its bidirectional driving condition and thereafter de-energizing said servo mechanism.

3. Reversing gearing comprising a forward-drive transmission path in parallel with a reverse-drive transmission path between an input shaft and an output shaft, each of said paths including an inverted free-wheel coupling provided with control means operable in one sense for rendering the coupling bidirectionally free and in the other sense for rendering the coupling bidirectionally locked, a common actuating member, resilient operative connections between said actuating member and the control means of both of said couplings for simultaneously biasing either of said control means in the opposite sense to the other of said control means, and means operable for temporarily imparting a reversed rotation to said input shaft.

4. Reversing gearing comprising a forward-drive transmission path in parallel with a reverse-drive transmission path between an input shaft and an output shaft, each of said paths including an inverted free-wheel coupling provided with locking means operable for converting the coupling into condition to transmit both driving and over-running torques, back-turning means operable for temporarily imparting a reverse rotation to said input shaft, and a common control member for said couplings and said back-turning means, said control member serving in one position to maintain both of said couplings and said back-turning means operative and being displaceable in two different senses from said position to lock bidirectionally said couplings alternatively and thereafter to de-energize said back-turning means.

5. A reversing power plant comprising a motor, means for varying the speed of said motor, a reversing gearing comprising a forward-drive transmission path in parallel with a reverse-drive transmission path between an input shaft an an output shaft, each of said paths including an inverted free-wheel coupling provided with locking means operable for converting the coupling into condition to transmit both driving and over-running torques, a slippable coupling connecting said motor to said input shaft, servo mechanism operable for temporarily urging said input shaft to rotate in a direction opposite to its normal direction, and a common control member associated with said speed-varying means, with the locking means of both of said free-wheel couplings and with said servo mechanism, said control member in one position retarding said motor and energizing said servo mechanism, and being displaceable in different senses from said position to bidirectionally lock said free wheel couplings alternatively and to de-energize said servo mechanism and accelerate said motor.

HAROLD SINCLAIR.